United States Patent
Sung et al.

(10) Patent No.: US 10,939,365 B1
(45) Date of Patent: Mar. 2, 2021

(54) DYNAMIC ESTABLISHMENT AND MAINTENANCE OF SECONDARY-COVERAGE SCAN LIST FOR DUAL-CONNECTIVITY

(71) Applicant: Sprint Spectrum L.P., Overland Park, KS (US)

(72) Inventors: Sanghoon Sung, Ashburn, VA (US); Udit Thakore, Fairfax, VA (US); Yu Wang, Fairfax, VA (US); George W. Harter, III, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/929,232

(22) Filed: Feb. 25, 2020

(51) Int. Cl.
*H04W 48/16* (2009.01)
*H04W 24/10* (2009.01)
*H04W 24/08* (2009.01)
*H04W 76/15* (2018.01)

(52) U.S. Cl.
CPC ........... *H04W 48/16* (2013.01); *H04W 24/08* (2013.01); *H04W 24/10* (2013.01); *H04W 76/15* (2018.02)

(58) Field of Classification Search
CPC ..... H04W 48/16; H04W 76/15; H04W 24/10; H04W 24/08
See application file for complete search history.

(56) References Cited

U.S. PATENT DOCUMENTS

| | | | |
|---|---|---|---|
| 9,668,186 B2 | 5/2017 | Zhang et al. | |
| 9,894,573 B2 | 2/2018 | Pani et al. | |
| 10,368,253 B2 | 7/2019 | Lei et al. | |
| 2016/0127969 A1* | 5/2016 | Pao | H04W 36/0088 455/437 |
| 2018/0098258 A1* | 4/2018 | Annam | H04W 24/10 |
| 2018/0249362 A1 | 8/2018 | Kim et al. | |

FOREIGN PATENT DOCUMENTS

| | | |
|---|---|---|
| EP | 2 083 587 | 1/2008 |
| WO | WO 00/38456 | 6/2000 |
| WO | WO 2016/110432 | 7/2016 |
| WO | WO 2018/23115 | 12/2018 |

OTHER PUBLICATIONS

Tweet4technology, "Measurement Control(RRC Connection Reconfiguration) in LTE," printed from the World Wide Web, https://tweet4technology.blogspot.com/2016/11/measurement-controlrrc . . ., dated Nov. 28, 2016.
U.S. Appl. No. 15/929,201, filed Jan. 9, 2020.

* cited by examiner

Primary Examiner — Marcos L Torres

(57) ABSTRACT

A mechanism for controlling secondary-coverage scanning for configuring dual-connectivity. A computing system establishes for a primary access node a scan list of secondary cells based on the primary access node having an X2 interface for each secondary cell and having received a threshold extent of B1 measurement reporting indicating threshold strong coverage of the secondary cell for configuration of dual-connectivity. Further, the computing system establishes for each secondary cell of the scan list a respective B1 measurement threshold based on evaluation of performance history of the secondary cell such as based on extent of secondary-access-node-addition failures involving the secondary cell and/or based on communication-quality metrics such as error rate or retransmission rate. The computing system then configures the primary access node to provide a B1 measurement object conveying the scan list with measurement thresholds.

20 Claims, 4 Drawing Sheets

DYNAMIC ESTABLISHMENT AND MAINTENANCE OF SECONDARY-COVERAGE SCAN LIST FOR DUAL-CONNECTIVITY

BACKGROUND

A cellular wireless network typically includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), defining separate frequency channels for downlink and uplink communication, or time division duplex (TDD), with a single frequency channel multiplexed over time between downlink and uplink use. Further, each cell could have a physical cell identifier (PCI) or the like that identifies the cell on the carrier, to help distinguish adjacent or otherwise nearby cells that operate on the same carrier as each other. Accordingly, each cell could be characterized by a respective combination of its carrier and its PCI.

Further, on the downlink and uplink, the air interface of each cell could be structured to define various physical channels, including air-interface resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

Further, on certain downlink air-interface resources, the access node could broadcast information to facilitate UE discovery and measurement of cell coverage. For instance, at particular subcarriers and with defined timing, the access node could broadcast the cell's PCI to enable UEs to discover coverage of the cell. And at other particular subcarriers with defined timing, the access node could broadcast a reference signal that UEs could measure as a basis to determine coverage strength of the cell.

OVERVIEW

In example operation, when a UE enters into coverage of such a network, the UE could initially scan for coverage on one or more carriers and could detect threshold strong coverage of a given cell provided by a given access node. And the UE could then engage in random-access and connection signaling, such as Radio Resource Control (RRC) signaling, with the access node to establish an air-interface connection (e.g., RRC connection) through which the access node will then serve the UE in the cell.

Further, if the UE is not already registered for service with the core network, the UE could transmit to the access node an attach request, which the access node could forward to a core-network controller for processing. And the core-network controller and access node could then responsively coordinate setup for the UE a user-plane bearer, including an access-bearer that extends between the access node and a core-network gateway system providing connectivity with a transport network and a data-radio-bearer (DRB) that extends over the air between the access node and the UE.

Once the UE is so connected and registered, the access node could then serve the UE in a connected mode over the established air-interface connection, coordinating downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the UE's air-interface connection. Likewise, when the UE has data to transmit on the transport network, the UE could transmit a scheduling request over the air-interface connection to the access node, the access node could responsively schedule transmission of that data from the UE on particular uplink PRBs of the air-interface connection, and the UE could accordingly transmit the data to the access node for forwarding through the core network to the transport network.

When the industry advances from one generation of wireless technology to the next, or in other scenarios, networks and UEs may also support dual-connectivity service, where a UE is served on co-existing connections according to multiple different RATs.

For instance, a first access node could provide service according to a first RAT and a second access node could provide service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first access node operating according to the first RAT ("first-RAT access node) could function as a primary access node or master node (MN), responsible for coordinating setup and teardown of dual-connectivity service for the UE and functioning as an anchor point for RRC signaling and core-network control signaling related to the dual-connected UE. And the second access node operating according to the second RAT ("second-RAT access node") could function as a secondary access node or secondary node (SN) mainly to provide added connectivity and increased aggregate bandwidth for the UE.

In such an implementation, when the UE first enters into network coverage, the UE could scan for coverage on the first RAT and could discover threshold strong coverage of the first-RAT access node and responsively establish a first connection between the UE and the first-RAT access node ("first-RAT connection") as discussed above, and the UE could attach with the core network if appropriate. The first-RAT access node could then serve the UE in a first-RAT standalone mode (i.e., under just the first RAT) with packet-data communications as described above.

In relation to the UE's attachment, and/or at another time, the first-RAT access node could also receive from the UE or the network controller a capability report that indicates various capabilities of the UE, including for instance whether the UE is dual-connectivity capable. If the UE is dual-connectivity capable, the first-RAT access node could then trigger and/or engage in a process to establish for the UE a second connection between the UE and a second-RAT access node ("second-RAT connection"), so that the first-RAT access node and second-RAT access node can then cooperatively provide the UE with dual-connectivity service.

To facilitate this process, the first-RAT access node could be provisioned in advance with a list of various second-RAT cells, each having coverage that may overlap with the cell on which the UE is connected with the first-RAT access node. Each of these second-RAT cells might be provided by a separate respective second-RAT access node, or some may be provided by the same second-RAT access node as each other.

Operating as MN, the first-RAT access node could then transmit to the UE an RRC signaling message or the like that provides a measurement object (e.g., an inter-RAT, "B1" measurement object) listing various second-RAT cells that the UE should scan. For each listed second-RAT cell, the measurement object could specify the cell's carrier and PCI. Further, for each listed second-RAT cell, the measurement object could specify a measurement threshold, such as a coverage strength value (e.g., in decibel milliwatts (dBm)) against which the UE should compare measured coverage strength of that cell to determine whether the coverage strength of the cell is strong enough to justify adding the cell for dual-connectivity.

In response, the UE could thus scan for coverage of the listed second-RAT cells. And upon detecting threshold strong coverage of at least one such second-RAT cell provided by a given second access node, and the UE could transmit to the MN a measurement report specifying the detected cell, such as by indicating the PCI can carrier of the second-RAT cell.

Given this measurement report from the UE, the MN could then engage in an SN-addition process to add for the UE a second-RAT connection in the reported cell, with the second-RAT access node operating as SN, so that the UE could then be served concurrently by the MN over the first-RAT connection and the SN over the second-RAT connection.

In an example implementation, for instance, the MN could transmit over an X2 interface or other inter-access-node interface to the SN an SN-addition request message, providing RRC and DRB configuration information and other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then transmit a random-access signal to the SN, and the SN could respond to the UE with a random-access response message, which could complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller a bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data over an X2 interface or the like to the MN, which the MN could then transmit to the UE over the UE's first-RAT connection. Likewise, when the UE has data to transmit, the UE could transmit a portion of the data over the UE's first-RAT connection to the MN, which the MN could forward over the X2 interface or the like to the SN and the SN could transmit over the UE's access bearer to the gateway system, and the UE could transmit another portion of the data over the UE's second-RAT connection to the SN, which the SN could transmit over the UE's access bearer to the gateway system.

One technical issue that can arise in the above process is that the second-RAT cells that the MN is pre-provisioned to list in the measurement object that the MN transmits to the UE to trigger scanning, measurement, and reporting for dual-connectivity setup might not all be optimal to configure for use as secondary cells in dual-connectivity service for UEs served by the MN, perhaps specifically for UEs served in the first-RAT cell in which the UE is connected.

By way of example, coverage of a given such second-RAT cell might not actually overlap sufficiently or at all with coverage of the MN on the first-RAT cell, in which case the UE may waste time and energy scanning for coverage of that second-RAT cell and not discover such coverage. As another example, as to a given listed second-RAT cell, the MN might not have an established X2 interface or the like with the second-RAT access node that provides the second-RAT cell, so the MN may be unable to engage in SN-addition signaling with that second-RAT access node, and the SN-addition process may therefore fail.

As yet another example, high uplink noise (e.g., from nearby small cells or the like) between the UE and the second-RAT access node in the second-RAT cell might prevent the UE's random-access signaling from successfully reaching the SN, in which case SN-addition may also fail. And as still another example, due to interference or other issues, the second-RAT access node may provide relatively low quality service on the second-RAT cell for UEs being served concurrently by the MN.

The present disclosure provides a mechanism that may help to address this issue, by dynamically controlling configuration of the measurement object that an MN provides to a UE to facilitate scanning for second-RAT coverage for dual-connectivity service.

In accordance with the disclosure, a computing system could initially define the list of second-RAT cells that the MN will include in the measurement object, by limiting the list to be second-RAT cells provided by second-RAT access nodes with which the MN has established X2 or other inter-access-node interfaces. For instance, the computing system could consult neighbor data or the like to determine which second-RAT access nodes are provided by second-RAT access nodes with which the MN has an X2 interface, and the computing system could include second-RAT cells on the list responsive to and only if the MN has an X2 interface with the associated second-RAT access node. Further, if X2 interfaces are provided on a per-cell basis rather than a per-access-node basis, this same analysis could be conducted specifically on a per-cell basis.

Further, the computing system could then dynamically modify the list of second-RAT cells based on an historical evaluation of which second-RAT cells have been detected and reported by UE(s) served by the MN as being threshold strong for possible addition for dual-connectivity service. For instance, the computing system could maintain on the list only each such second-RAT cell that UE(s) served by the MN have reported sufficiently often as being sufficiently strong to justify adding the second-RAT cell for dual-connectivity service and could delete from the list any other second-RAT cells based on their having not been so reported.

And still further, based on performance history of each listed second-RAT cell, the computing system could dynamically set the measurement threshold that the measurement object specifies for the second-RAT cell, to help control the likelihood of a UE reporting threshold strong coverage of the second-RAT cell and triggering associated SN addition. For instance, for each listed second-RAT cell, the computing system could monitor performance metrics that may relate to dual-connectivity, such as rates of transmission errors, retransmissions, call drops, and/or SN-addition failures.

In response to such performance of a given listed second-RAT cell being poor, the computing system could then set the measurement threshold for that second-RAT cell to a relatively high level so as to require a UE to detect stronger downlink coverage of the second-RAT cell before reporting the coverage and trigger associated SN-addition. Whereas, in response to performance of a given listed second-RAT cell being good, the computing system could set the measurement threshold for that second-RAT cell at a lower level so that a UE could more readily detect threshold strong coverage of the second-RAT cell and trigger associated SN-addition.

Moreover, the computing system could iteratively repeat this process, such as by periodically re-evaluating to include in the list those second-RAT cells with whose second-RAT access node the MN has an X2 interface, modifying the set of second-RAT cells in the list based measurement report statistics, and tailoring measurement thresholds based on performance metrics.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as a master access node (e.g., MeNB) to provide primary coverage for dual-connectivity, and a 5G access node (5G next-generation Node-B (gNB)) functions a secondary access node (e.g., SgNB) to provide secondary coverage for dual-connectivity. Thus, a UE would first establish a standalone-4G connection with a 4G eNB, the 4G eNB would then provide the UE with a measurement object to have the UE scan for coverage of various listed 5G cells and, upon receipt of a measurement report from the UE indicating that the UE is within threshold strong coverage of a given 5G cell that is provided by a given 5G gNB, the 4G eNB could then coordinate setup of EN-DC service for the UE, including setup for the UE of a secondary 5G connection with the 5G gNB in the detected 5G cell. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
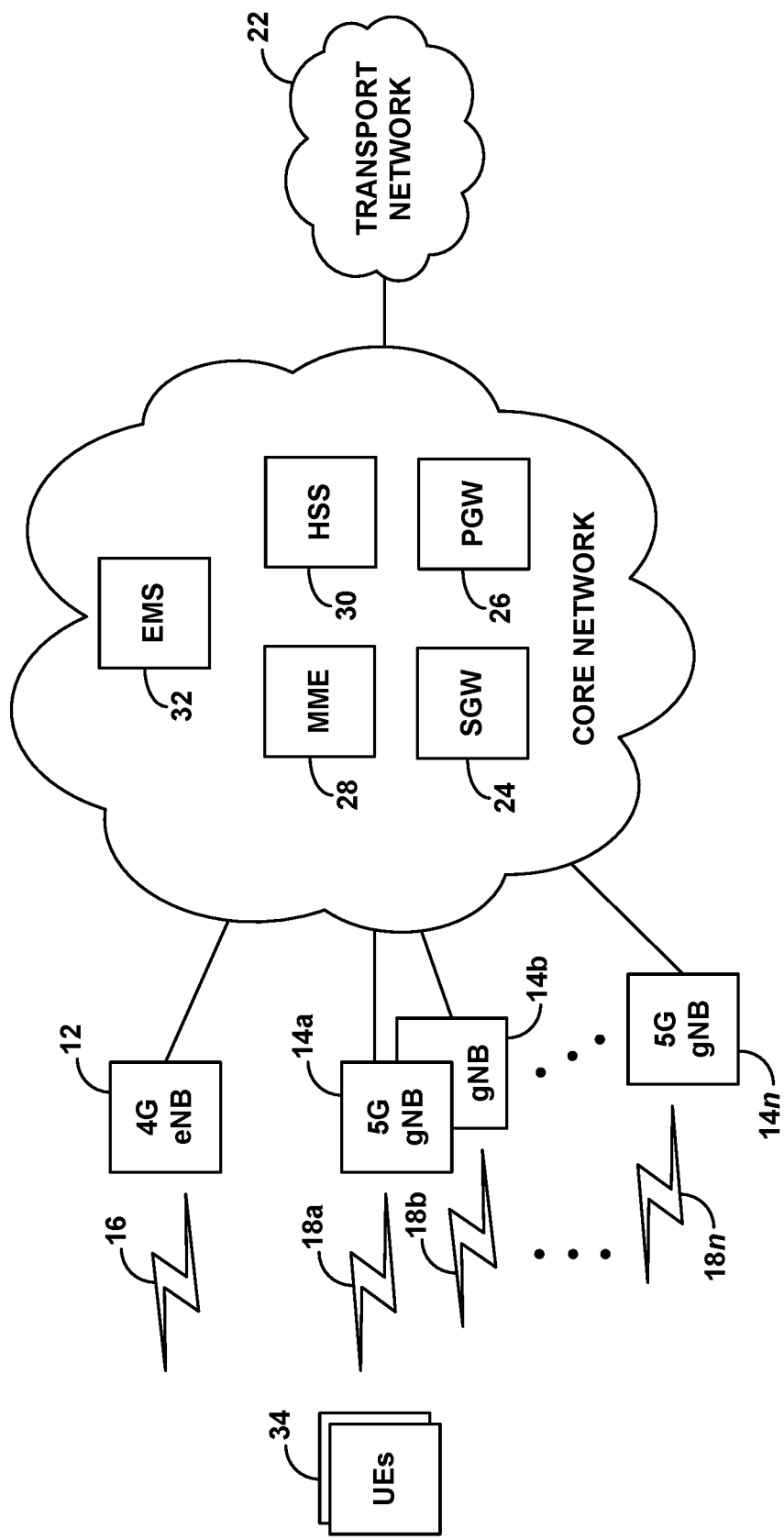
FIG. 1 is a simplified block diagram of an example network arrangement in which aspects of the present disclosure can be implemented.

FIG. 1 is a simplified block diagram of an example network arrangement including a 4G eNB 12 and multiple 5G gNBs 14a, 14b, . . . 14n. Each of these access nodes could be a macro access node of the type configured to provide a wide range of coverage or could take other forms, such as a small cell access node, a repeater, a femtocell access node, or the like, possibly configured to provide a smaller range of coverage, and the access nodes could be different types than each other.

Although some of the 5G gNBs 14 are shown overlapping with each other, they may or may not be collocated with each other. Further, one or more of the 5G gNBs 14 could be collocated with the 4G eNB 12, or all of the 5G gNBs 14 could be located separately from the 4G eNB 12.

Each access node could be configured provide one or more cells according to the access node's respective RAT. As shown by way of example, the 4G eNB 12 could be configured to provide a 4G cell 16, and the 5G gNBs 14a, 14b, . . . 14n could be configured to provide 5G cells 18a, 18b, . . . 18n. As discussed above, each of these cells could be defined on a respective carrier, which could be TDD or FDD, and each cell could have a respective PCI that distinguishes the cell from other nearby cells on the same carrier.

In an example implementation, coverage of the 4G cell 12 may overlap with respective coverage of one or more of the 5G cells 18 provided by the 5G gNBs 14, so that a UE could be served concurrently by the 4G eNB 12 in the 4G cell and by a 5G gNB 14 in a respective 5G cell 18.

As noted above, the air interface defined by each cell could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of the carrier on which the cell is defined could be divided into subcarriers with specified subcarrier spacing on the order of 15 to 240 kHz. With this example arrangement, the air interface of each cell would define an array of resource elements each occupying a respective subcarrier and spanning a respective symbol time segment, and the access node and UEs could communicate with each other through modulation of the subcarriers to carry data in those resource elements. Variations of this arrangement are possible as well.

Further, particular sets of these resource elements on the example air interface could be grouped together to define the PRBs discussed above. For instance, each PRB could span one timeslot in the time domain and a group of subcarriers in the frequency domain. Depending on the cell's carrier bandwidth, the air interface of the cell could thus support a certain number of such PRBs across the bandwidth of the carrier within each timeslot.

In addition, certain resource elements on the downlink and uplink of the example air interface could be reserved for special purposes.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could be allocated to carry data communications from the access node to UEs.

Further, in certain downlink subframes, a group of resource elements centered on the center frequency of each carrier could be reserved to carry synchronization signals that could encode or otherwise establish the cell's PCI, so that UEs could scan for and find the PCI both as a basis to discover coverage of the cell and also to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe (with the pattern possibly established by a modulo operation keyed to one of the synchronization signals) could be reserved to carry a reference signal that UEs could measure as a basis to evaluate coverage strength.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could be allocated to carry data communications from UEs to the access node. Further, still other resources on the uplink could be reserved for other purposes as well, such as for carrying uplink reference signals or the like. Note also that the 4G air interface and 4G service provided by the 4G eNB 12 in the 4G cell 16 could differ from the 5G air interface and 5G service provided by each 5G gNB 14 in a respective 5G cell 18 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example of FIG. 1, the 4G eNB 12 and 5G gNBs 14 are each shown interconnected with a core network 20 that provides connectivity with a transport network 22. The core network 20 could be a packet-switched network configured as an Evolved Packet Core (EPC) network or a Next Generation Core (NGC) core network, among other possibilities. Further, in an alternative embodiment, various access nodes could be connected with different core networks.

As shown, core network 20 could include a serving gateway (SGW) 24, a packet data network gateway (PGW) 26, a mobility management entity (MME) 28, and a home subscriber server (HSS) 30. SGW 26 and PGW 28 could operate as the gateway system noted above, providing user-plane connectivity to enable a UE served by an access node to engage in communication on the transport network 22. And the MME 28 could operate as the core-network controller noted above, to carry out operations such as coordinating UE attachment and setup of user-plane bearers. Further, HSS 30 could store UE profile records, which could specify service-subscription plans, UE configurations, and/or UE capability information, such as whether a UE is EN-DC capable for instance.

In addition, the example core network 20 is shown including an element management system (EMS) 32. The EMS 32 which could operate as a central repository of operational data for the wireless communication network and to control and manage operation of various network elements. For instance, entities such as the access nodes could regularly report to the EMS various operational data, such as data regarding UE connectivity, quality of service, measurement reports, and other information related to service of UEs. And the EMS could oversee operation of the access nodes and other entities, providing operation directives or the like to which the entities could be configured to respond accordingly.

Core network 20 could be a packet-switched network on which entities have assigned Internet Protocol (IP) addresses, and interfaces could be statically or dynamically defined between various entities, as virtual packet tunnels for instance.

By way of example, for user-plane communications, an S1-U tunnel could be defined between an access node and the SGW, and an S5 tunnel could be defined between the SGW and the PGW. And for control-plane signaling, an S1-MME tunnel could be defined between an access node and the MME, and an S11 tunnel could be defined between the MME and the SGW.

Further, an X2 interface could be defined respectively between each of various pairs of access nodes, such as respectively between the 4G eNB 12 and each of one or more of the 5G gNBs 14, to facilitate signaling and/or bearer communication between the access nodes. In practice, an X2 interface between two access nodes could be configured manually by engineering input or could be configured through an automatic neighbor relation (ANR) process, such as by UEs served by one access node reporting presence of the other access node and the serving access node then determining the IP address of the other access node and engaging in X2 setup signaling with the other access node to establish an X2 interface. This X2 setup signaling could inform each access node of operating parameters of the other access node, such the cells (e.g., carriers and PCIs) on which the other access node provides service, among other possibilities. And when an X2 interface is established between a pair of access nodes, each access could maintain a record of the established X2 interface, including an indication of the other access node's IP address and operational parameters. Further, establishment of the X2 interface could also be reported to the EMS and/or one or more other entities.

FIG. 1 also illustrates a number of example UEs 34 that may from time to time be within coverage of the example network. Each such UE could take any of the forms described above, among other possibilities and could be EN-DC capable.

In line with the discussion above, when an EN-DC-capable UE initially enters into coverage of the network, the UE could discover coverage of the 4G eNB 12, such as by scanning one or more predefined 4G carriers to find synchronization signals being broadcast by the 4G eNB 12 and then determining that a reference signal from the 4G eNB 12 is strong enough to justify connecting. As noted above, the UE could then engage in random-access signaling and RRC signaling with the 4G eNB 12 to establish an RRC connection, and the 4G eNB 12 could establish a context record indicating the state of the UE's 4G connection and service.

With its RRC connection established, the UE could then transmit to the 4G eNB 12 an attach request message, which the 4G eNB 12 could forward to the MME 28 for processing. And upon authenticating and authorizing the UE for service, the MME 28 and 4G eNB 12 could coordinate setup for the UE of at least one user-plane bearer. For instance, the MME 28 could engage in signaling with the 4G eNB 12 and the SGW 24 to coordinate setup for the UE of a respective S1-U packet tunnel between the 4G eNB 12 and the SGW 24, and the SGW 24 could responsively engage in signaling with the PGW 26 to coordinate setup for the UE of a respective associated S5 packet tunnel between the SGW 24 and the PGW 26. Further, the 4G eNB 12 could engage in signaling with the UE to establish a DRB and other configuration parameters cooperatively defining a 4G connection for the UE.

In relation to this attachment process, the 4G eNB 12 could also transmit to the UE an RRC message carrying a UE-capability enquiry, and the UE could respond to the 4G eNB 12 with a "UE capability information" information element (IE), which could indicate that the UE is EN-DC capable. Alternatively, the 4G eNB 12 could receive such capability information from the MME, which could obtain the information from the HSS 30.

As the UE is EN-DC capable, the 4G eNB 12 could then work to configure EN-DC service for the UE. In line with the discussion above, for instance, the 4G eNB 12, operating as MeNB, could first transmit to the UE (e.g., in an RRC message) a B1 (inter-RAT) measurement object that directs the UE to scan for coverage of various 5G cells. As noted above, this B1 measurement object can list each 5G cell by its respective carrier and PCI and can designate for each listed 5G cell a B1 measurement threshold. Further, the measurement object could list the 5G cells in a priority order, which could define an order in which the UE should scan for coverage of the cells.

Without limitation, the B1 measurement threshold specified for one or more given 5G cells could be a minimum threshold level of reference signal receive power (RSRP) and/or reference signal receive quality (RSRQ) that the UE would need to receive on the 5G cell as a condition for the UE reporting to the 4G eNB 12 that the UE is within threshold strong coverage of the 5G cell. For instance, the B1 measurement threshold could be RSRP on the order of at least −116 decibel-milliwatts (dBm) to −95 dBm. In practice, the threshold analysis could involve determining whether the detected coverage strength is at least as high as the specified threshold itself or at least as high as the specified threshold plus a defined constant, or could involve determining whether the detected coverage strength plus a defined constant (e.g., a bias value) is at least as high as the specified threshold, among other possibilities.

Responsive to the measurement object provided by the 4G eNB 12, the UE could thus scan for coverage of the various listed 5G cells. Namely, for each listed 5G cell, the UE could scan the indicated carrier in search of synchronization signals representing the indicated PCI. And upon finding such a 5G cell, the UE could then measure the cell's coverage strength and determine whether the measured coverage strength is at least as strong as the specified B1 measurement threshold. Once the UE thus finds a threshold strong 5G cell, the UE could then transmit to the 4G eNB 12 (e.g., in an RRC message) a measurement report indicating that the UE detected threshold strong coverage of that 5G cell, identifying the cell by its carrier and PCI and/or by another cell identifier.

In line with the discussion above, the 4G eNB 12 could then respond to the UE's measurement report by engaging in a process to add the 5G cell as a secondary cell for EN-DC service of the UE. For instance, the 4G eNB 12 could transmit over an X2 interface to the 5G gNB 14 that provides the 5G cell an SgNB-Addition request to cause the 5G gNB to allocate resources for a 5G connection for the UE in the cell, the 4G eNB 12 could receive an SgNB-Addition-Request acknowledge message from the 5G gNB 14, and the 4G eNB 12 could engage in associated RRC signaling with the UE, in response to which the UE could then transmit to the 5G gNB 14 in the 5G cell a random-access signal and the 5G gNB 14 could respond to the UE. Further, the 4G eNB 12 could engage in signaling as described above to transfer to the UE's access bearer to the 5G gNB 14 as well.

The 4G eNB 12 and 5G gNB 14 could then provide the UE with EN-DC service, concurrently serving the UE over their respective connections with the UE. Namely, the 4G eNB 12 could allocate PRBs of its 4G cell 16 as needed to carry data over the 4G connection between the 4G eNB 12 and the UE, and the 5G gNB 14 could allocate PRBs of its 5G cell 18 as needed to carry data over the 5G connection between the 5G gNB 14 and the UE.

Unfortunately, however, various problems could occur with respect to a given 5G cell that is listed in the B1 measurement object that the 4G eNB 12 sends to a UE to facilitate scanning for secondary 5G coverage for EN-DC.

One problem that could arise is that a 5G cell could be listed in the B1 measurement object even though the 5G cell overlaps very little if at all with the 4G cell in which the UE has its primary 4G connection with the 4G eNB 12. In that scenario, as noted above, the UE may waste time and resources scanning for coverage of the 5G cell but is unlikely to discover threshold strong coverage of the 5G cell.

Another problem that could occur is that the SgNB-addition process to add a UE-reported 5G cell as a secondary cell for EN-DC service of the UE may fail. As noted above, this could happen for various reasons. For example, SgNB-addition failure could occur if the 4G eNB 12 does not have an established X2 interface for the 5G cell, such as by not having an X2 interface with the 5G gNB 14 that provides the 5G cell, or by having an X2 interface with that 5G gNB 14 but that is not listed as being associated with that particular 5G cell. Without an X2 interface, the 4G eNB 12 would be unable to send an SgNB-Addition request for adding the 5G cell, and so SgNB-addition would fail. And another example, SgNB-addition failure could occur if there is high uplink noise in the 5G cell, possibly from nearby transmitters or the like, as that high uplink noise may prevent the 5G gNB 14 to receive the UE's random-access signaling as part of the SgNB-addition process. Other examples are possible as well.

Further, another problem that occur is that, after successful SgNB-addition of the 5G cell for EN-DC service of the UE, the quality of the service provided by the 5G gNB 14 to the UE in the 5G cell as part of the UE's EN-DC service may be poor. For instance, due to high uplink noise or other factors, air-interface communication between the UE and the 5G gNB 14 in the 5G cell may experience a high rate of transmission errors (e.g., high block error rate (BLER) or the like) and/or an associated high rate of retransmissions, which could result in delayed or failed communication. Further, for those or other reasons, the UE may lose its secondary 5G connection with the 5G gNB 14, which could result in the UE experiencing a call drop or other communication loss.

In accordance with the present disclosure, as noted above, a computing system could keep track of these or other such issues per 5G cell and could use these records as a basis to tailor the list of 5G cells that the 4G eNB 12 will provide to a UE in a B1 measurement object, and further as a basis to set the B1 measurement threshold that the 4G eNB 12 will specify for each listed 5G cell. Through this process, the computing system could thereby help to control both which 5G cells are included the list and the likelihood of a UE detecting and reporting being in threshold strong coverage of the listed 5G cells.

In practice, the computing system could be implemented by the 4G eNB 12, by the EMS 32, and/or by one or more other entities.

In an example implementation, the computing system could initially define the list of 5G cells as those 5G cells for which the 4G eNB 12 has an established X2 interface. As noted above the 4G eNB 12 could have an X2 interface respectively with each of various 5G gNBs, with each such X2 interface indicating the 5G cell(s) on which the 5G gNB provides service. The computing system could refer to data indicating the 4G eNB's established X2 interfaces and, based on that data, could compile a list of the 5G cells for which the 4G eNB 12 has an X2 interface. For instance, data indicating the existence of an X2 interface between the 4G eNB 12 and another access node that operates on a 5G carrier (e.g., in a frequency band set aside for 5G service) might indicate that the X2 interface is with a 5G eNB, and data indicating that that 5G gNB provides service on one more particular 5G cells (e.g., particular PCI-carrier combinations) could thus establish that the 4G eNB 12 has an X2 interface respectively for each such 5G cell.

Thus, the initial set of listed 5G cells would be limited to those 5G cells for which the 4G eNB 12 has an X2 interface, and each 5G cell for which the 4G eNB 12 has an X2 interface could be initially included in the list.

Optimally, this step could thereby help to avoid the above-noted issue where a 5G cell is included in the list even though the 4G eNB 12 does not have an X2 interface for that 5G cell.

In turn or concurrently, the computing system could refine the list of 5G cells to include just those 5G cells as to which the 4G eNB 12 has received B1 measurement reporting of threshold strong 5G coverage.

For instance, as the 4G eNB 12 receives B1 measurement reports from UEs to facilitate configuration of EN-DC service, the 4G eNB 12 could keep a record per 5G cell of instances where the 4G eNB 12 received a report of threshold strong coverage of the 5G cell, and the 4G eNB 12 could forward these reports to the EMS 23 as well. Based on this data, the computing system could then evaluate to determine for each 5G cell on the list whether the 4G eNB 12 has received a threshold extent of such B1 measurement reports, such as at least one, at least two, or at least another predefined number of such reports over a recent sliding window of time. And the computing system could then retain on the list just those 5G cells as to which the 4G eNB 12 has received a threshold extent of such B1 measurement reports and could drop from the list any and each 5G cell as to which the 4G eNB 12 has not received a threshold extent of such B1 measurement reports.

Optimally, this step could thereby help to avoid the above-noted issue where a 5G cell is included in the list even though a UE connected with the 4G eNB 12 is relatively unlikely to detect and report threshold strong coverage of the 5G cell.

In addition, for each 5G cell included in the list, the computing system could use one or more performance metrics for the 5G cell as a basis to establish a B1 measurement threshold that B1 measurement object should specify for the 5G cell. In particular, as noted above, the computing system could establish a relatively high B1 measurement threshold for a 5G cell with relatively poor performance history, and the computing system could establish a relatively low B1 measurement threshold for a 5G cell with relatively good performance history.

Optimally, this step could thereby help to control the likelihood of UEs reporting threshold strong coverage of a given listed 5G cell. Namely, by setting a higher B1 measurement threshold for a 5G cell with poor performance history, this step could help to reduce the probability of UEs reporting threshold strong coverage of a 5G cell that has poor performance history. And by setting a lower B1 measurement threshold for a 5G cell with good performance history, this step could help to increase the probability of UEs reporting threshold strong coverage of a 5G cell that has good performance history.

The computing system could consider various performance metrics for this purpose, factoring one or more such performance metrics into the determination of B1 measurement threshold to set per listed 5G cell.

As one example, the computing system could set the B1 measurement threshold for a given 5G cell based on an evaluation of the extent of SgNB-addition failures involving that 5G cell. To facilitate this, the computing system could keep track of occurrences of SgNB-addition failures on a per-5G-cell basis. The computing system could learn of each such SgNB-addition failure as to a given 5G cell by receiving from the associated 5G gNB a notification of the failure, e.g., responsive to the 5G gNB not receiving expected random-access signaling from the UE in the SgNB-addition process. Alternatively the computing system could learn of an SgNB-addition failure by receiving from the UE a notification of the failure, e.g., responsive to the UE not receiving from the 5G gNB a response to the UE's random-access signaling in the SgNB-addition process. Other mechanisms are possible as well.

As another example, the computing system could set the B1 measurement threshold for a given 5G cell based on evaluation of quality of communication service provided in the 5G cell, perhaps specifically for UEs that have a secondary 5G connection in the 5G cell while having a primary 4G connection in 4G cell 16. Examples of such performance metrics include BLER and/or retransmission rate, among other possibilities. The computing system could learn of these metrics by receiving reports of the metrics from the 5G gNB or the UE, among other possibilities.

The computing system could take into account any of these and/or one or more other such performance metrics per 5G cell over a recent sliding window of time, representing latest performance history of the 5G cell. And for each listed 5G cell, the computing system could set a B1 measurement threshold accordingly. For instance, if the performance history of a given listed 5G cell is relatively poor, then the computing system could responsively set a relatively high B1 measurement threshold for the 5G cell. Whereas, if the performance history of a given listed 5G cell is relatively good, then the computing system could responsively set a relatively low B1 measurement threshold for the 5G cell.

In an example implementation, the computing system could have a default B1 measurement threshold value to specify per 5G cell, and the computing system could change this default measurement threshold for a given 5G cell based on this performance-history evaluation. For instance, the default B1 measurement threshold might be −95 dBm, an increased B1 measurement threshold for a 5G cell deemed to have poor performance history could be −92 dBm or another value stronger than the default, and a decreased B1 measurement threshold for a 5G cell deemed to have good performance history could be −98 dBm or another value weaker than the default. Note also that the act of increasing or decreasing the B1 measurement threshold could alternatively be accomplished by setting a corresponding bias value that a UE would use to offset the UE's measured coverage strength of the 5G cell.

In practice, the establishment of the B1 measurement threshold could per listed 5G cell could thus be considered to be dynamic, in that the computing system could dynamically decide whether to increase the threshold, decrease the threshold, or maintain the threshold at the default value, and could proceed accordingly.

In the example implementation, once the computing system has dynamically established the list of 5G cells with associated B1 measurement thresholds, the computing system will then configure the 4G eNB 12 to use that list of 5G cells with associated B1 measurement thresholds. Namely, the computing system could configure the 4G eNB 12 such that the next time the 4G eNB would provide a B1 measurement object to a served UE to cause the UE to scan for 5G coverage for secondary 5G connectivity to facilitate EN-DC setup, the 4G eNB 12 would provide the established list of 5G cells with the associated B1 measurement thresholds. If the computing system is implemented by the 4G eNB 12 itself, then the computing system might so configure the 4G eNB 12 by storing the established list with associated B1 measurement thresholds at the 4G eNB 12, the 4G eNB 12 being programmed to use the stored list accordingly. Whereas, if the computing system is implemented at the EMS and/or another entity external to the 4G eNB 12, then the computing system might so configure the 4G eNB 12 by sending the established list with associated B1 measurement thresholds to the 4G eNB 12 for storage and use accordingly.

Note also that the computing system could repeatedly carry out this process or portions of this process, to help maintain an updated list of 5G cells and associated B1 measurement thresholds for use by the 4G eNB 12. For instance, periodically or in response to one or more other triggers (such as changes in data related to X2 interfaces or performance metrics), the computing system could carry out the process in order to update the list with associated B1 measurement thresholds and could re-configure the 4G eNB 12 accordingly.

Figure 2:
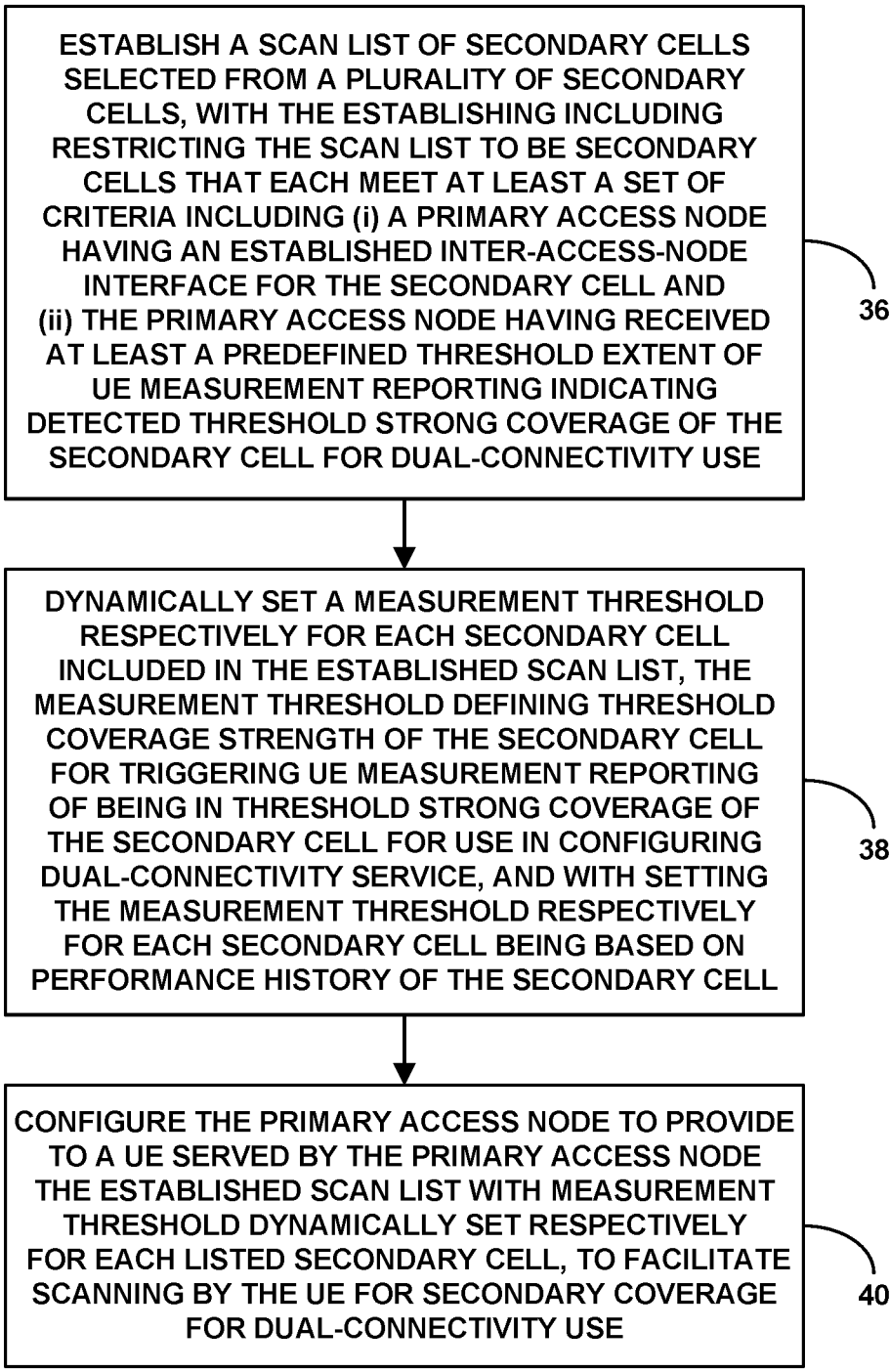
FIG. 2 is a flow chart depicting an example method in accordance with the disclosure.

FIG. 2 is next a flow chart depicting a method that could be carried out in accordance with the present disclosure to dynamically control secondary-coverage scanning for configuration of dual-connectivity service, in a wireless communication system that includes a primary access node configured to provide a primary cell and one or more secondary access nodes configured to provide a plurality of secondary cells.

As shown in FIG. 2, at block 36, the method includes a computing system establishing a scan list of secondary cells selected from the plurality of secondary cells, with the establishing including restricting the scan list to be secondary cells that each meet at least a set of criteria including (i) the primary access node having an established inter-accessnode interface for the secondary cell and (ii) the primary access node having received at least a predefined threshold extent of UE measurement reporting indicating detected threshold strong coverage of the secondary cell for dual-connectivity use.

Further, at block 38, the method includes the computing system dynamically setting a measurement threshold respectively for each secondary cell included in the established scan list, the measurement threshold defining threshold coverage strength of the secondary cell for triggering UE measurement reporting of being in threshold strong coverage of the secondary cell for use in configuring the dual-connectivity service, and with setting the measurement threshold respectively for each secondary cell being based on performance history of the secondary cell.

And at block 40, the method includes the computing system configuring the primary access node to provide to a UE served by the primary access node the established scan list with measurement threshold dynamically set respectively for each listed secondary cell, to facilitate scanning by the UE for secondary coverage for the dual-connectivity service.

In line with the discussion above, in this method, the primary cell could be configured according to a first RAT, and each secondary cell could be configured according to a secondary RAT different than the first RAT. For instance, the first RAT could be 4G LTE, the second RAT could be 5G NR, and the dual-connectivity service could be EN-DC. Further, as discussed above, the inter-access node interface could be an X2 interface, the measurement reporting could be B1 measurement reporting, and the measurement threshold could be a B1 measurement threshold.

As further discussed above, the act of restricting the scan list to be secondary cells for each of which the primary access node has an inter-access-node interface could involve referring to data of inter-access-node interfaces established for the primary access node, to identify based on the data each secondary cell for which the primary access node has an established inter-access-node interface.

Still further, as discussed above, the act of restricting the scan list to be secondary cells for each of which the primary access node has received at least the predefined threshold extent of UE measurement reporting indicating detected threshold strong coverage of the secondary cell dual-connectivity use could involve referring to records of B1 measurement reports received by the primary access node to determine based on the records each secondary cell for which the primary access node has received at least a predefined extent (e.g., a predefined quantity or rate) of B1 measurement reports for use in configuring dual-connectivity.

In addition, as discussed above, the act of setting the measurement threshold respectively for each secondary cell included in the established scan list based on performance history of the secondary cell could involve setting the measurement threshold for a given secondary cell based on an extent of secondary-access-node-addition failures involving the secondary cell.

Here, the secondary-access-node-addition failures involving the secondary cell could each involve failure to establish a secondary connection in the secondary cell for dual-connectivity. Further, the act of setting the measurement threshold for a given secondary cell based on the extent of secondary-access-node-addition failures involving the secondary cell could involve (i) increasing the measurement threshold from a default based on the extent of secondary-access-node-addition failures involving the secondary cell being at least a predefined high threshold or (ii) decreasing the measurement threshold from a default based on the extent of secondary-access-node-addition failures involving the secondary cell being less than a predefined low threshold.

Further, as discussed above, the act of setting the measurement threshold respectively for each secondary cell included in the established scan list based on performance history of the secondary cell could involve setting the measurement threshold for a given secondary cell based on communication quality in the secondary cell. For instance, this could be based on communication quality as represented by a metric such as block error rate and/or retransmission rate.

Still further, the act of configuring the primary access node to provide to the UE served by the primary access node the established scan list with measurement threshold dynamically set respectively for each listed secondary cell, to facilitate scanning by the UE for secondary coverage for the dual-connectivity service, could involve causing the primary access node to store the established scan list with measurement threshold dynamically set respectively for each listed secondary cell, in a scenario where the primary access node is configured to transmit in a measurement object to the UE the stored established scan list with measurement threshold dynamically set respectively for each listed secondary cell. In this way, the UE could thus scan in accordance with the measurement object, to facilitate measurement reporting for configuring the dual-connectivity service.

Yet further, as discussed above, this method could be performed by the primary access node and/or by an entity external to the primary access node (e.g., by an EMS or other entity). And as noted above, the method could be repeatedly (e.g. iteratively) performed to help maintain updated B1 measurement object data for use by the primary access node.

Note also that the primary access node could provide the established list of secondary cells and associated measurement thresholds to a UE by unicast transmission or by broadcasting the list in a system message that the UE receives, among other possibilities.

Figure 3:
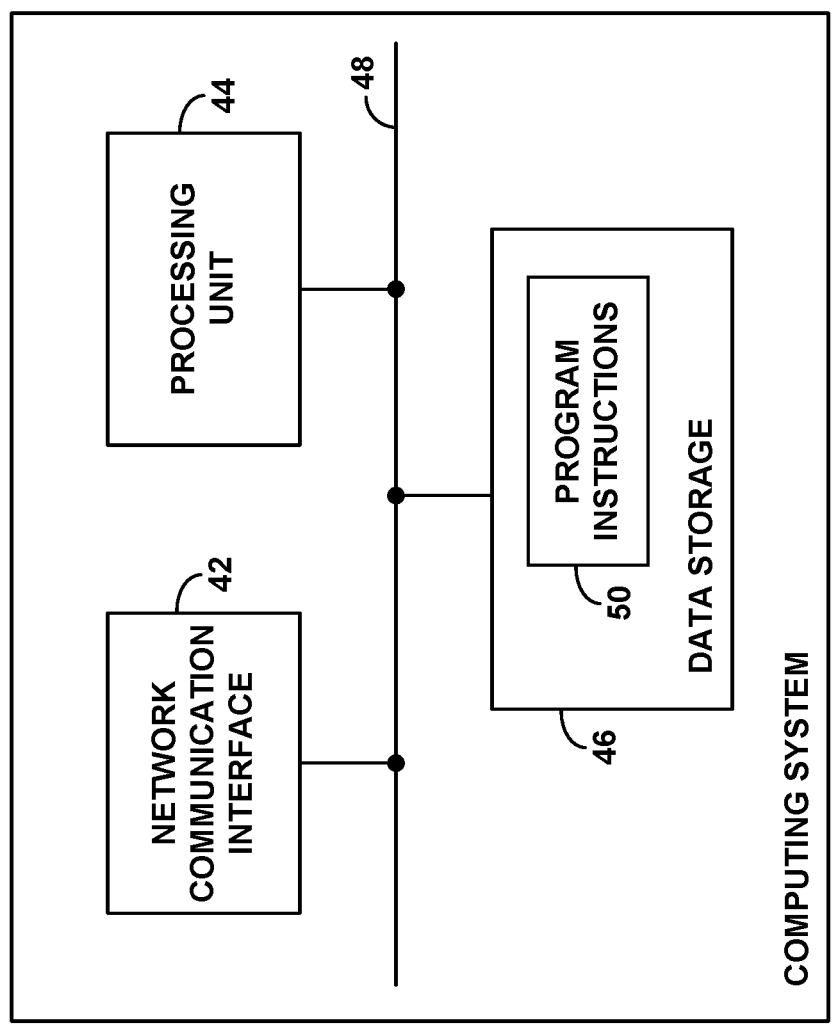
FIG. 3 is a simplified block diagram of an example computing system operable in accordance with the disclosure.

FIG. 3 is next a simplified block diagram of an example computing system that could be configured to carry out the operations described herein, to control secondary-coverage scanning for configuration of dual-connectivity service in a wireless communication system having a primary access node configured to provide a primary cell and one or more secondary access nodes configured to provide a plurality of secondary cells. As noted above, this computing system could be provided at the access node and/or at an EMS. Alternatively, the computing system could be provided as a standalone system and/or in another manner.

As shown in FIG. 3, the example computing system includes a network communication interface 42, at least one processing unit 44, and at least one non-transitory data storage 46, all of which could be integrated together and/or interconnected by a system bus, network, and/or other connection mechanism 48.

The network communication interface 50 could include a physical network connector and associated communication logic to facilitate network communication with various other entities. The at least one processing unit 44 could comprise one or more general purpose processors (e.g., microprocessors) and/or one or more special-purpose processors (e.g., application specific integrated circuits). And the at least one non-transitory data storage 46 could comprise one or more volatile and/or non-volatile storage components (e.g., magnetic, optical, or flash storage).

As shown, the data storage 46 could then store program instructions 50, which could be executable by the at least one processing unit 44 to carry out various operations described herein. For instance, the instructions could be executable to carry out the operations of FIG. 2.

Figure 4:
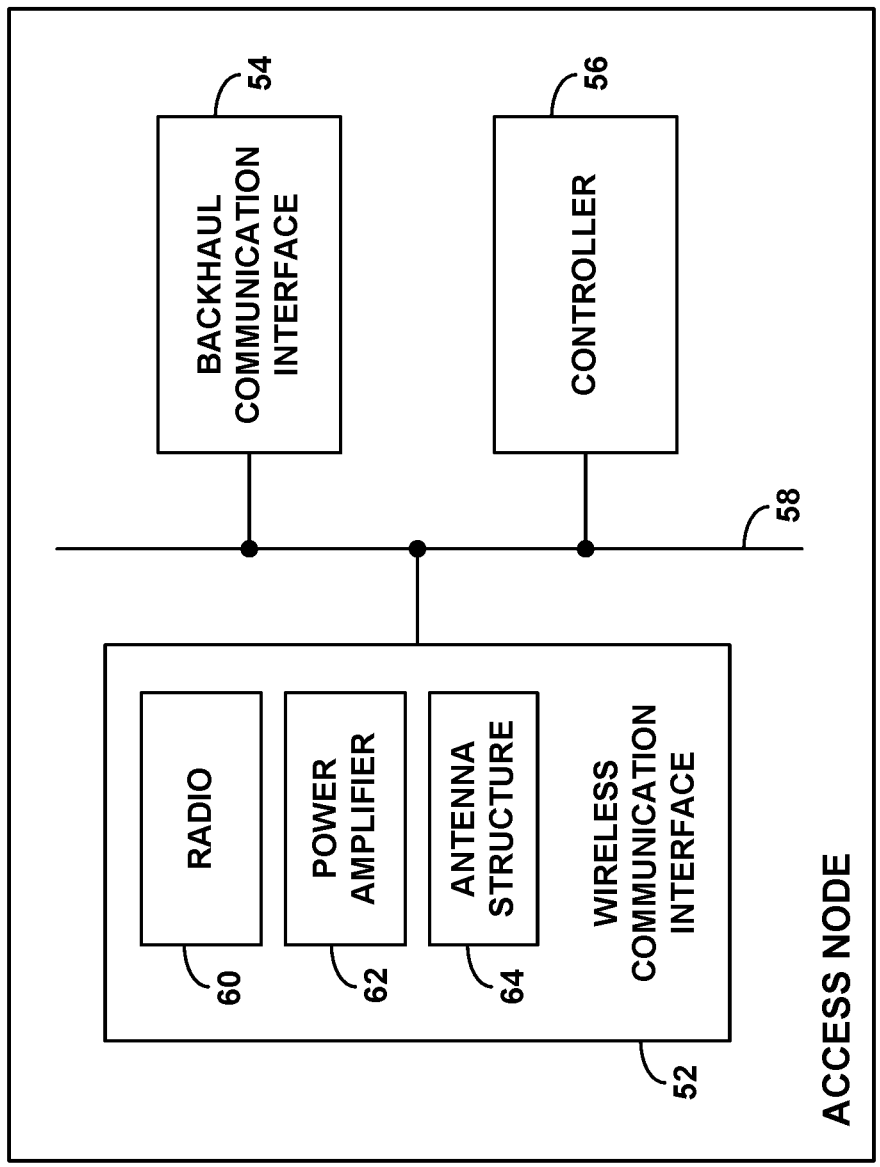
FIG. 4 is a simplified block diagram of an example access node operable in accordance with the disclosure.

Finally, FIG. 4 is a simplified block diagram of an example access node that could operate in accordance with the present disclosure, as 4G eNB 12 for instance.

As shown in FIG. 4, the example access node includes a wireless communication interface 52, a backhaul communication interface 54, and a controller 56, which could be integrated together and/or communicatively linked by a network, system bus, or other connection mechanism 58.

Wireless communication interface 54 includes a radio 60, a power amplifier 62, and antenna structure 64. The radio 60 could operate to interface between encoded baseband signals and radio frequency signals. The power amplifier 62 could operate to amplify signals for transmission by the antenna structure 64. And the antenna structure 64 could comprise a plurality of antennas for communicating over the air interface, such as a massive-MIMO array for instance, which could facilitate beamforming and other operations.

Backhaul communication interface 54 could be a network communication interface (e.g., an Ethernet network interface port and/or connection) through which the access node can communicate with various other network entities.

And controller 56, which could comprise at least one processing unit, at least one non-transitory data storage, and program instructions stored in the at least one non-transitory data storage and executable by the at least one processing unit or could take other forms, could be operable to cause the access node to carry out various operations as described herein.

Various features described above can be implemented in this context as well, and vice versa.

Further, the present disclosure contemplates a computer-readable medium encoded with, storing, or otherwise embodying program instructions executable by a processing unit to carry out various operations described herein.

Exemplary embodiments have been described above. Those skilled in the art will understand, however, that changes and modifications may be made to these embodiments without departing from the true scope and spirit of the invention.

We claim:

1. A method to control secondary-coverage scanning for configuration of dual-connectivity service in a wireless communication system including a primary access node configured to provide a primary cell and one or more secondary access nodes configured to provide a plurality of secondary cells, the method comprising:

establishing, by a computing system, a scan list of secondary cells selected from the plurality of secondary cells, wherein the establishing comprises restricting the scan list to be secondary cells that each meet at least a set of criteria including (i) the primary access node having an established inter-access-node interface for the secondary cell and (ii) the primary access node having received at least a predefined threshold extent of user-equipment device (UE) measurement reporting indicating detected threshold strong coverage of the secondary cell for dual-connectivity use;

dynamically setting, by the computing system, a measurement threshold respectively for each secondary cell included in the established scan list, wherein the measurement threshold defines threshold coverage strength of the secondary cell for triggering UE measurement reporting of being in threshold strong coverage of the secondary cell for use in configuring the dual-connectivity service, and wherein setting the measurement threshold respectively for each secondary cell is based on performance history of the secondary cell; and configuring, by the computing system, the primary access node to provide to a UE served by the primary access node the established scan list with measurement threshold dynamically set respectively for each listed secondary cell, to facilitate scanning by the UE for secondary coverage for the dual-connectivity service.

2. The method of claim 1, wherein the primary cell is configured according to a first radio access technology (RAT), and wherein each secondary cell is configured according to a secondary RAT different than the first RAT.

3. The method of claim 2, wherein the first RAT is 4G LTE, wherein the second RAT is 5G NR, and wherein the dual-connectivity service is EUTRA-NR Dual Connectivity (EN-DC).

4. The method of claim 1, wherein the inter-access-node interface is an X2 interface.

5. The method of claim 1, wherein restricting the scan list to be secondary cells for each of which the primary access node has an inter-access-node interface comprises referring to data of inter-access-node interfaces established for the primary access node, to identify based on the data each secondary cell for which the primary access node has an established inter-access-node interface.

6. The method of claim 1, wherein the measurement reporting is B1 measurement reporting.

7. The method of claim 6, wherein restricting the scan list to be secondary cells for each of which the primary access node has received at least the predefined threshold extent of UE measurement reporting indicating detected threshold strong coverage of the secondary cell dual-connectivity use comprises referring to records of B1 measurement reports received by the primary access node to determine based on the records each secondary cell for which the primary access node has received at least a predefined extent of B1 measurement reports for use in configuring dual-connectivity.

8. The method of claim 1, wherein setting the measurement threshold respectively for each secondary cell included in the established scan list based on performance history of the secondary cell comprises setting the measurement threshold for a given secondary cell based on an extent of secondary-access-node-addition failures involving the secondary cell.

9. The method of claim 8, wherein the secondary-access-node-addition failures involving the secondary cell each involve failure to establish a secondary connection in the secondary cell for dual-connectivity.

10. The method of claim 8, wherein setting the measurement threshold for a given secondary cell based on the extent of secondary-access-node-addition failures involving the secondary cell comprises (i) increasing the measurement threshold from a default based on the extent of secondary-access-node-addition failures involving the secondary cell being at least a predefined high threshold or (ii) decreasing the measurement threshold from a default based on the extent of secondary-access-node-addition failures involving the secondary cell being less than a predefined low threshold.

11. The method of claim 1, wherein setting the measurement threshold respectively for each secondary cell included in the established scan list based on performance history of the secondary cell comprises setting the measurement threshold for a given secondary cell based on communication quality in the secondary cell.

12. The method of claim 11, wherein the communication quality is represented by a metric selected from the group consisting of block error rate and retransmission rate.

13. The method of claim 1, wherein configuring the primary access node to provide to the UE served by the primary access node the established scan list with measurement threshold dynamically set respectively for each listed secondary cell, to facilitate scanning by the UE for secondary coverage for the dual-connectivity service comprises:
    causing the primary access node to store the established scan list with measurement threshold dynamically set respectively for each listed secondary cell,
    wherein the primary access node is configured to transmit in a measurement object to the UE the stored established scan list with measurement threshold dynamically set respectively for each listed secondary cell,
    whereby the UE scans in accordance with the measurement object, to facilitate measurement reporting for configuring the dual-connectivity service.

14. The method of claim 1, wherein the method is performed by the primary access node.

15. The method of claim 1, wherein the method is performed by an entity external to the primary access node.

16. The method of claim 1, further comprising repeatedly performing the method.

17. A computing system operable to control secondary-coverage scanning for configuration of dual-connectivity service in a wireless communication system having a primary access node configured to provide a primary cell and one or more secondary access nodes configured to provide a plurality of secondary cells, the computing system comprising:
    at least one processing unit;
    at least one non-transitory data storage; and
    program instructions stored in the at least one non-transitory data storage and executable by the at least one processing unit to carry out operations including:
        establishing a scan list of secondary cells selected from the plurality of secondary cells, wherein the establishing comprises restricting the scan list to be secondary cells that each meet at least a set of criteria including (i) the primary access node having an established inter-access-node interface for the secondary cell and (ii) the primary access node having received at least a predefined threshold extent of user-equipment device (UE) measurement reporting indicating detected threshold strong coverage of the secondary cell for dual-connectivity use,
        dynamically setting a measurement threshold respectively for each secondary cell included in the established scan list, wherein the measurement threshold defines threshold coverage strength of the secondary cell for triggering UE measurement reporting of being in threshold strong coverage of the secondary cell for use in configuring the dual-connectivity service, and wherein setting the measurement threshold respectively for each secondary cell is based on performance history of the secondary cell, and
        configuring the primary access node to provide to a UE served by the primary access node the established scan list with measurement threshold dynamically set respectively for each listed secondary cell, to facilitate scanning by the UE for secondary coverage for the dual-connectivity service.

18. The method of claim 17, wherein the primary cell is configured according to a first radio access technology (RAT), and wherein each secondary cell is configured according to a secondary RAT different than the first RAT.

19. The method of claim 17, wherein the first RAT is 4G LTE, wherein the second RAT is 5G NR, and wherein the dual-connectivity service is EUTRA-NR Dual Connectivity (EN-DC).

20. The method of claim 17, wherein the measurement threshold is a B1 measurement threshold.

* * * * *